United States Patent [19]

Maroschak

[11] 3,916,763

[45] Nov. 4, 1975

[54] APPARATUS FOR FORMING SLITS IN TUBES

[76] Inventor: Ernest J. Maroschak, Box 878, Roseboro, N.C. 28382

[22] Filed: May 29, 1974

[21] Appl. No.: 474,259

Related U.S. Application Data

[62] Division of Ser. No. 271,379, July 13, 1972, Pat. No. 3,831,470.

[52] U.S. Cl. .................... 90/15.1; 83/54; 83/278; 83/444; 83/490
[51] Int. Cl.² .. B23C 1/14; B23D 25/16; B26D 3/06
[58] Field of Search ....... 83/54, 276, 278, 261, 490, 83/423, 444; 90/15.1 R; 226/124

[56] References Cited
UNITED STATES PATENTS

| | | | |
|---|---|---|---|
| 552,947 | 1/1896 | Williams | 226/124 X |
| 3,620,115 | 11/1971 | Zieg et al. | 83/54 X |
| 3,759,123 | 9/1973 | Vanzon | 83/54 |
| 3,768,365 | 10/1973 | Howe | 83/54 X |

Primary Examiner—J. M. Meister
Attorney, Agent, or Firm—Parrott, Bell, Seltzer, Park & Gibson

[57] ABSTRACT

A tube is slit or slotted for use as an irrigation pipe, for example, by intermittently feeding the tube through a slitting station in a stepwise manner and moving a plurality of rotating cutting blades which encircle the path of travel of the tube into cutting engagement with the tube between successive stepwise movements thereof. The apparatus includes a pair of rotary feed members which engage portions of the tube closely adjacent sets of rotary cutting blades arranged around the path of travel of the tube. Means are provided for operating the rotary feed members to impart the stepwise movement to the tube in timed relation to inward and outward movements of the cutting blades, and means are provided for encirclingly restricting the tube against any substantial displacement by the cutting blades during their movement into cutting engagement with the tube.

1 Claim, 12 Drawing Figures

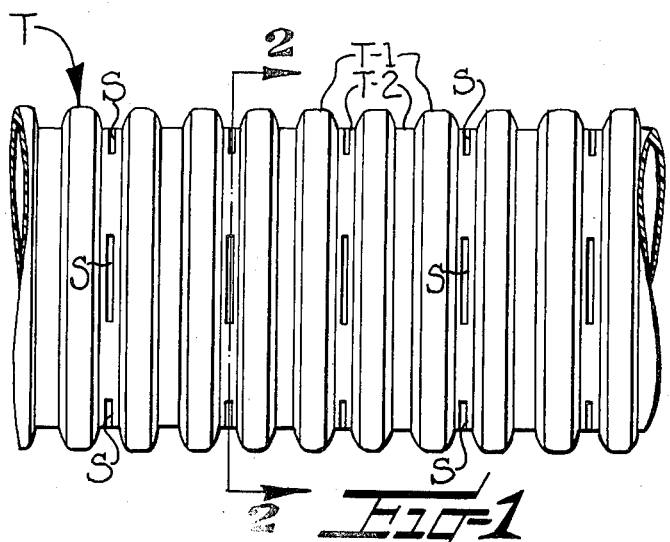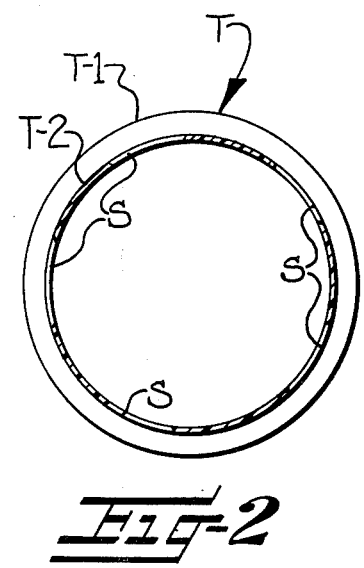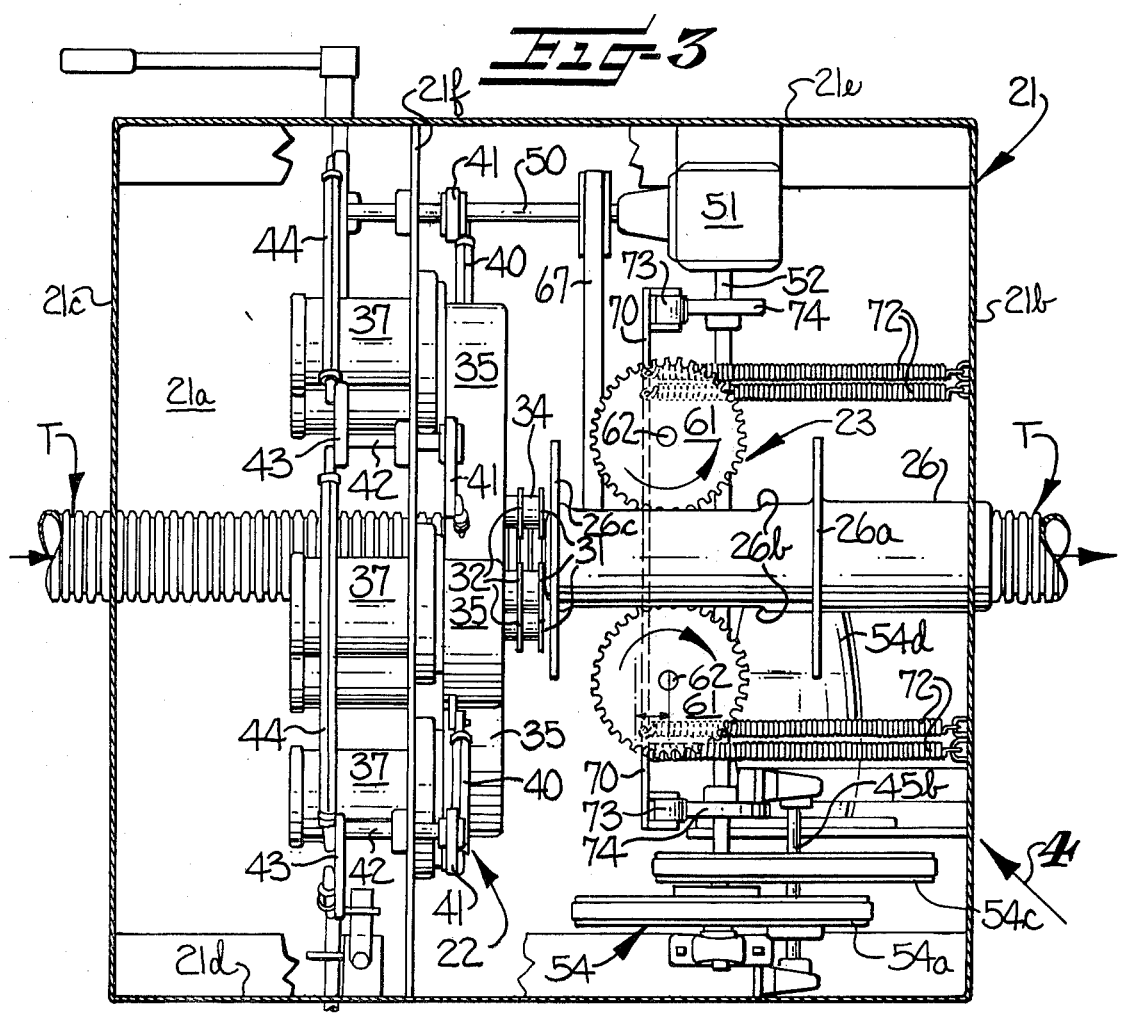

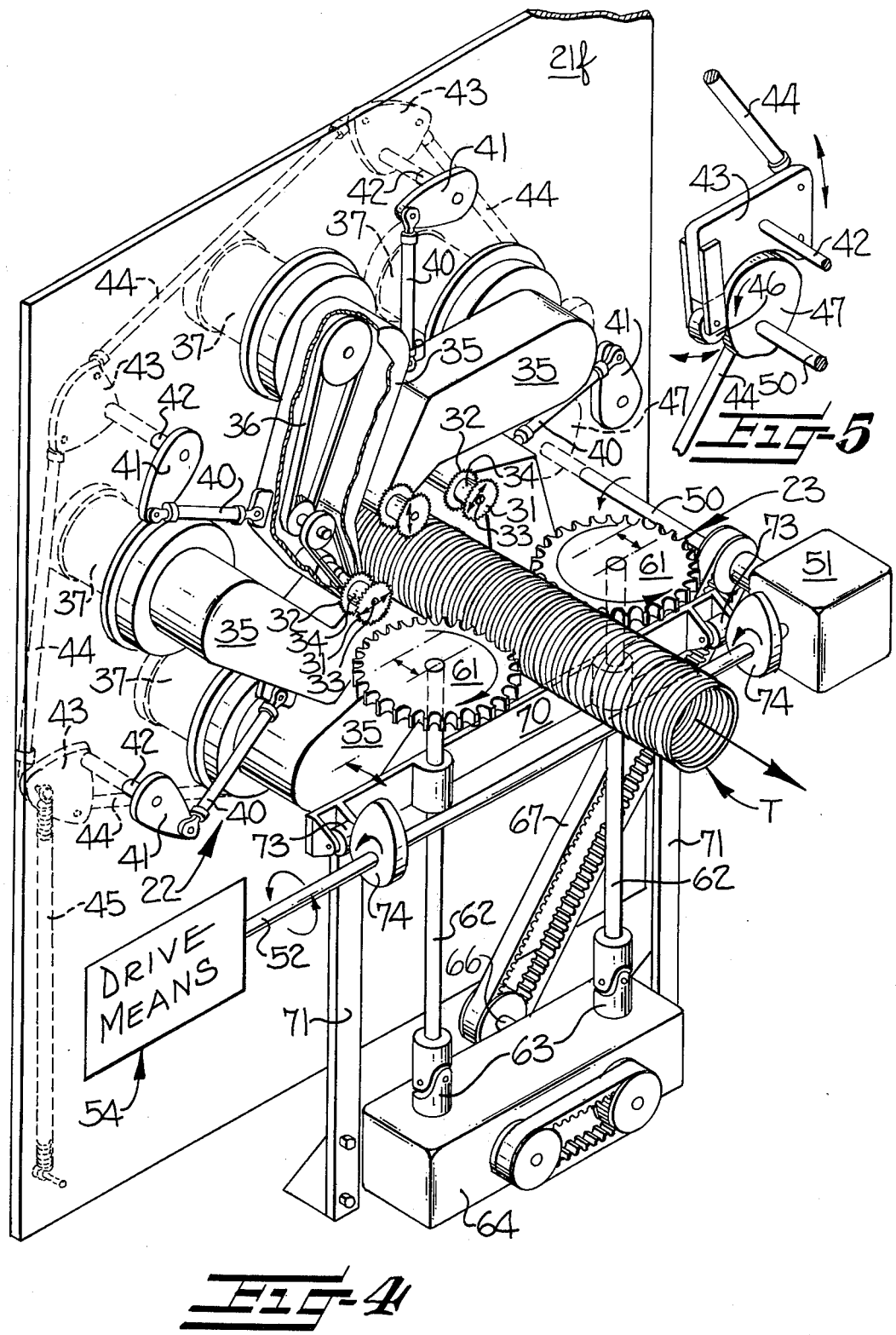

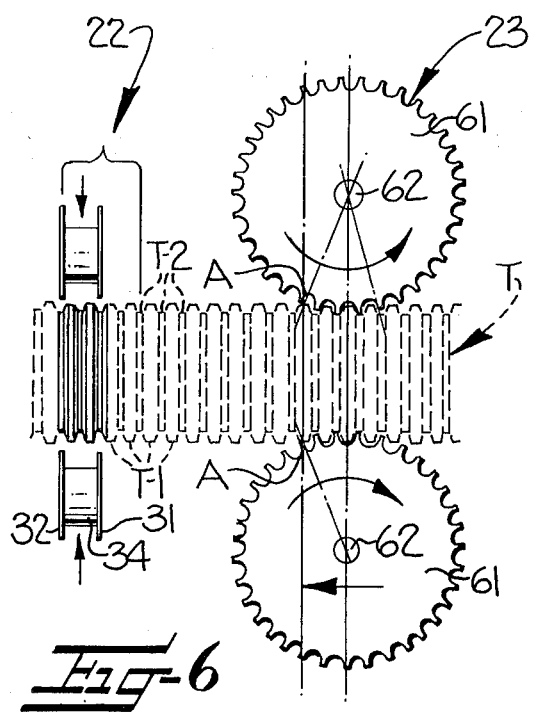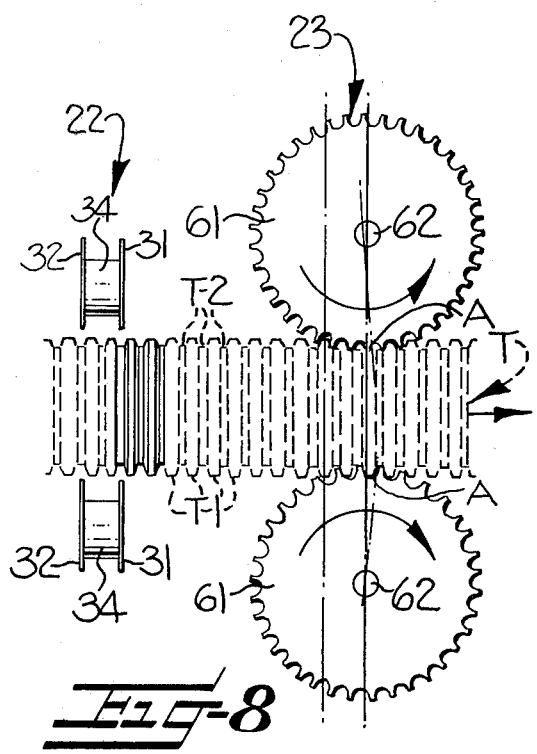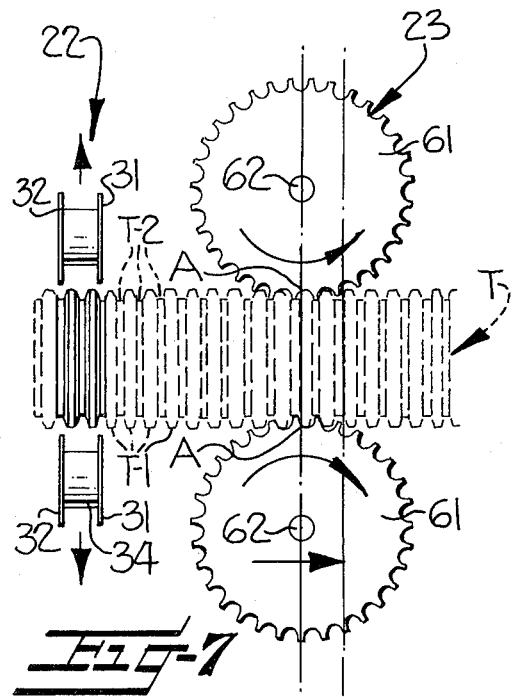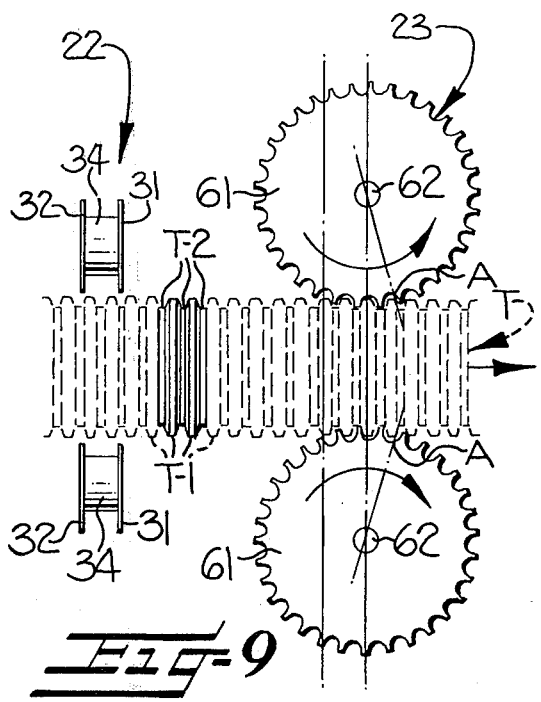

APPARATUS FOR FORMING SLITS IN TUBES

This application is a division of my copending application Ser. No. 271,379, filed July 13, 1972, and entitled METHOD AND APPARATUS FOR FORMING SLITS IN TUBES, now U.S. Pat. No. 3,831,470.

This invention relates to an improved apparatus for slitting tubes to form transverse slits around the tubes along the length thereof, and it is the primary object of this invention to provide an improved apparatus for feeding a tube through a slitting station in a stepwise manner, and wherein a set or sets of rotary cutting blades, arranged around the path of travel of the tube, are moved into and out of cutting engagement with the tube between successive stepwise movements thereof.

It is another object of this invention to provide an improved apparatus for forming slits in corrugated tubes and wherein at least one set of circularly arranged rotary cutting blades is used for forming slits in certain valleys of the corrugated tube.

It is another more specific object of this invention to provide an improved apparatus particularly devised for successively forming radial transverse slits in certain valleys of a plastic corrugated tube utilizing one or more rotary feed members in the form of feed gears for feeding the corrugated tube through a slitting station by meshingly engaging the corrugations of the tube with the peripheral teeth of at least one forwardly rotating feed gear with successive teeth thereof entering successive valleys and pushing forwardly against respective ribs of the corrugated tube and while continuously rotating the feed gear at a substantially constant peripheral speed, but causing the tube to dwell in the slitting station at predetermined intervals of predetermined duration by periodically imparting a rearward translational movement to the feed gear at a rate so correlated to the rate of forward rotation of the feed gear that the tube remains at a standstill in the slitting station throughout the rearward translational movement of the feed gear, then imparting a forward translational movement to the feed gear so that it moves the tube forwardly at a rate equal to the rate of rotation of the feed gear combined with the rate of forward translational movement of the feed gear, thereby accelerating the forward movement of the tube as compared to the peripheral speed of the feed gear.

Some of the objects of the invention having been stated, other objects will appear as the description proceeds when taken in connection with the accompanying drawings, in which FIG. 1 is a fragmentary side elevation of a portion of a corrugated plastic tube showing a preferred arrangement of slits in certain valleys thereof;

FIG. 2 is a transverse sectional view taken along line 2—2 in FIG. 1;

FIG. 3 is a top plan view of a preferred embodiment of the slitting station of the present invention;

FIG. 4 is an enlarged perspective view of the slitting station looking in the general direction of the arrow 4 in FIG. 3, but with many of the parts being omitted for purposes of clarity;

FIG. 5 is an enlarged fragmentary view of a cam for effecting radial inward and outward movement of the rotary cutting blades relative to the tube;

FIGS. 6–9 are fragmentary schematic plan views illustrating successive stages in the operation of the rotary cutting blades and feeding means of the slitting station;

Figure 10:
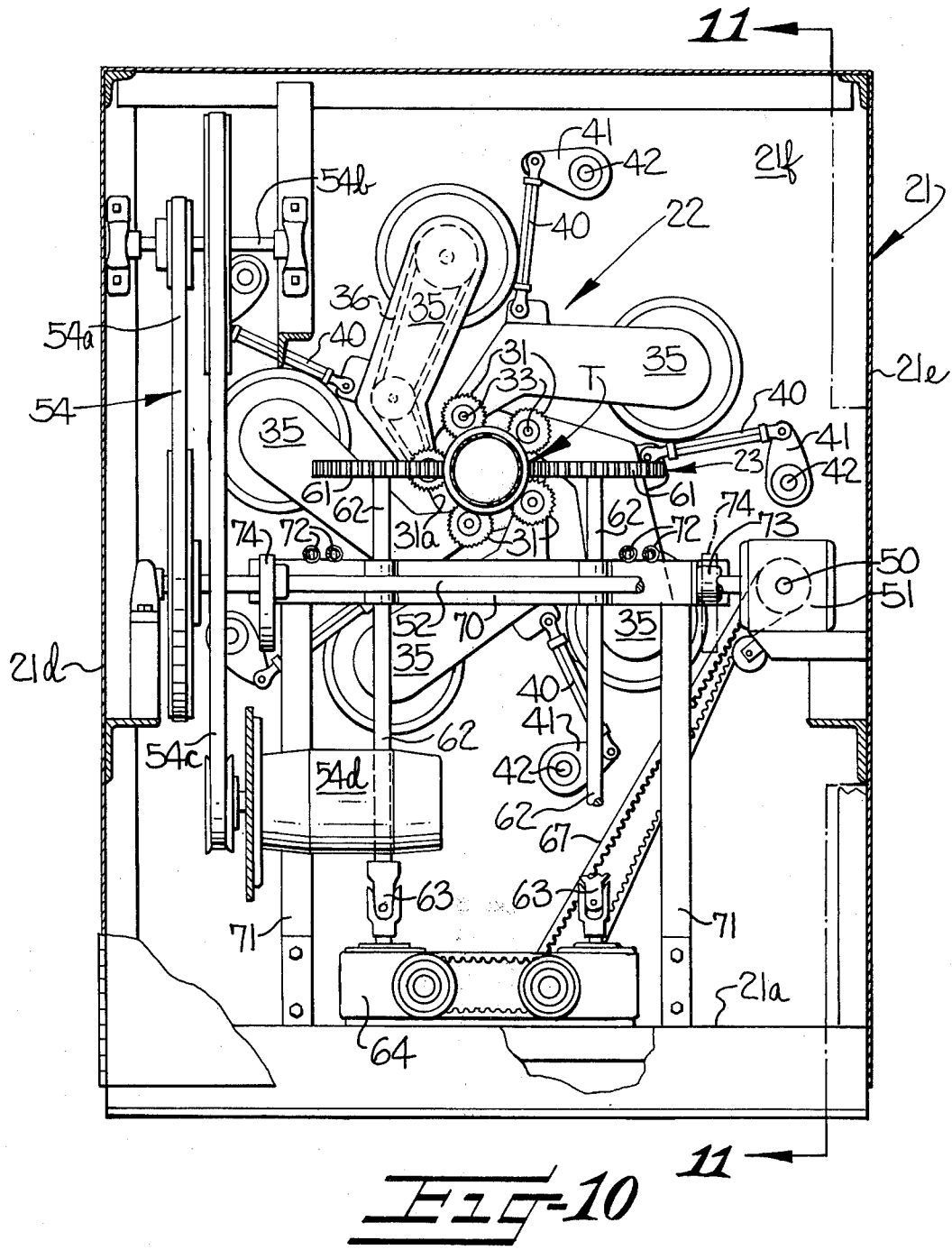
FIG. 10 is an elevation, partially in section, looking at the right-hand side of the slitting station in FIG. 3, but omitting the tubular guide means for the tube in which the slits are to be formed and also omitting other parts for purposes of clarity.

Referring more specifically to the drawings, the slitting machine or station for carrying out the method of this invention is constructed to form longitudinally spaced circular series of transverse slits in elongate members such as tubes of various types, and the slitting station is particularly devised for forming circularly arranged radial slits in corrugated plastic tubes to prepare such tubes for use in underground irrigation and drainage systems, for example. Accordingly, the slitting station will be described in connection with the slitting of a corrugated plastic tube such as that shown in FIGS. 1, 2 and 6–9, wherein the tube is broadly designated at T and includes annular corrugations of alternating ribs and valleys T-1, T-2 throughout the length thereof. According to the preferred embodiment of the invention, the slitting station is constructed to form a circular series of five transverse slits S through each of certain of the valleys T-2, and preferably in alternately spaced valleys T-2 of the tube T as shown in FIGS. 1 and 2.

The particular tube shown in FIGS. 1 and 2 may be of lightweight plastic preferably having a wall thickness of no more than one-sixteenth inch and a nominal diameter of about 4, 5, 6 or 7 inches. For example, a tube having a four inch nominal diameter may have an internal diameter of about 3.916 inches measured at the interior of the valleys T-2, and an external diameter of 4.566 inches. Also, by way of example, each rib T-1 of the tube T may have a width of approximately one-half inch, the height of each rib when measured from the annular valleys T-2 may be about 0.270 inch, and the width of the annular valleys T-2 taken between the junctures of the side walls of the adjacent ribs T-1 may be about 0.187 inch. In a plastic tube of the type last described, each of the slits S may be about one-sixteenth inch wide so that it is of substantially lesser width than the width of the corresponding valley T-2. Each slit extends arcuately or transversely through the respective valley T-2 for a distance of about three-fourths inch to 2 inches, with the desired length of each slit S being determined to some extent by the diameter of the plastic corrugated tube T and the will of the customer.

Referring now to the slitting station, in the illustrated embodiment, the slitting station comprises a substantially rectangular casing 21 including a base 21a, front and rear end walls 21b, 21c, opposing side walls 21d, 21e, and an intermediate transverse stationary wall or partition 21f spaced between front and rear walls 21b, 21c. Wall 21f may extend between and be connected to the opposing side walls 21d, 21e. Casing 21 contains a slitting means broadly designated at 22 and a positive tube feeding means broadly designated at 23 past which the tube T is guided in succession by suitable guide means best shown in FIG. 11 in the form of an ingress supporting roll 25, a rigid tubular guide 26 and an egress or front supporting roll 27.

The rear and front supporting rolls 25, 27 are rotatably mounted on substantially horizontal upper portions of respective inverted L-shaped bars 25a, 27a mounted for vertical adjustment in respective transverse frame members 21g, 21h of casing 21. Tubular guide 26 is disposed entirely forwardly of slitting means 22 with its forward portion penetrating and suitably secured to the front wall 21b of casing 21. An intermediate flange 26a encircling tubular guide 26 and welded or otherwise suitably secured thereto, is welded or otherwise suitably secured to an L-shaped frame member 21i (FIG. 11) for firmly securing the tubular guide 26 in the desired position. Preferably, tubular guide 26 defines an elongate passageway of an internal diameter only slightly greater than the external diameter of tube T so as to encirclingly restrict the tube T against any substantial lateral displacement and insure that tube T will not deviate from its intended path of travel during the cutting of slits S therein by blades 31, 32 and during the feeding of the tube T.

Slitting means 22 comprises a circularly arranged series of five substantially equally angularly spaced pairs of slitting saws of rotary cutting blades, with the rotary cutting blades of each pair being axially aligned and indicated at 31, 32. The axis of each pair of cutting blades 31, 32 extends substantially parallel with the path of travel of tube T through the slitting station. Each pair of rotary cutting blades 31, 32 is fixed on a corresponding shaft 33 on which the two blades 31, 32 are held in the desired spaced relationship by a suitable spacer or sleeve 34 therebetween.

The center-to-center distance between the two blades of each pair 31, 32 is substantially the same as the distance between the centers of alternate valleys T-2 of tube T so that, each time the five pairs of blades 31, 32 are moved radially inwardly into cutting relation with tube T, each pair of blades 31, 32 will cut corresponding slits S in two alternately spaced valleys T-2. In other words, each time the five pairs of cutting blades 31, 32 are moved into cutting relation with tube T, the two sets of blades simultaneously cut a circular series of spaced apart, elongate, transverse or arcuate, radial slits S around the tube and through each of two alternately spaced valleys T-2 thereof.

It is preferred that each rotary cutting blade 31, 32 is no more than about one-sixteenth inch thick. Each blade may be about 3¼ inches in diameter with the active or inward strokes thereof being such relative to the tube encircled thereby that each of slit S is about one-sixteenth inch wide and about ¾ to 2 inches long as heretofore indicated. The circular sets of blades 31, 32 also are disposed adjacent an opening 31a (FIG. 12) in stationary wall 21f through which tube T passes freely in its course through the slitting station.

Since there are five rotary cutting blades in each set, they are preferably arranged in equally spaced relation, or with about 72° between the centers thereof, in a circular manner around the path of travel of tube T through the slitting station. The shaft 33 supporting each pair of cutting blades 31, 32 is suitably journaled in the inner or free-end portion of a swingable or pivoted housing 35. As shown in FIGS. 4 and 10, each housing 35 contains suitable transmission means, embodied in suitable belt and pulley connections 36, which connect the corresponding shaft 33 to a respective electric drive motor 37. Thus, there are five motors 37 mounted in the partition 21f of casing 21 so that the housings of the motors 37 occupy fixed positions spaced around the axis of tube T as it moves through the slitting means 22 of the slitting station. Obviously, all cutter motors 37 are energized throughout operation of the slitting station.

Each swingable housing 35 may be pivotally mounted on partition 21f or on the corresponding end of the housing of the respective motor 37. Means are provided for simultaneously moving the inner portions of all housings 35 inwardly and outwardly in timed relation to stepwise forward movements of tube T as effected by the feeding means 23 to be later described. To this end, it will be observed in FIGS. 4, 10, 11 and 12 that a link 40 connects each housing 35 to a crank 41 fixed on one end of a respective rocker shaft 42. Rocker shafts 42 are journaled in stationary wall 21f and their rear ends, remote from cranks 41, have respective cranks 43 fixed thereon. All of the cranks 43 are interconnected by suitable links 44, there being one of the links 44 extending between and pivotally connected to each adjacent pair of cranks 43.

Figure 12:
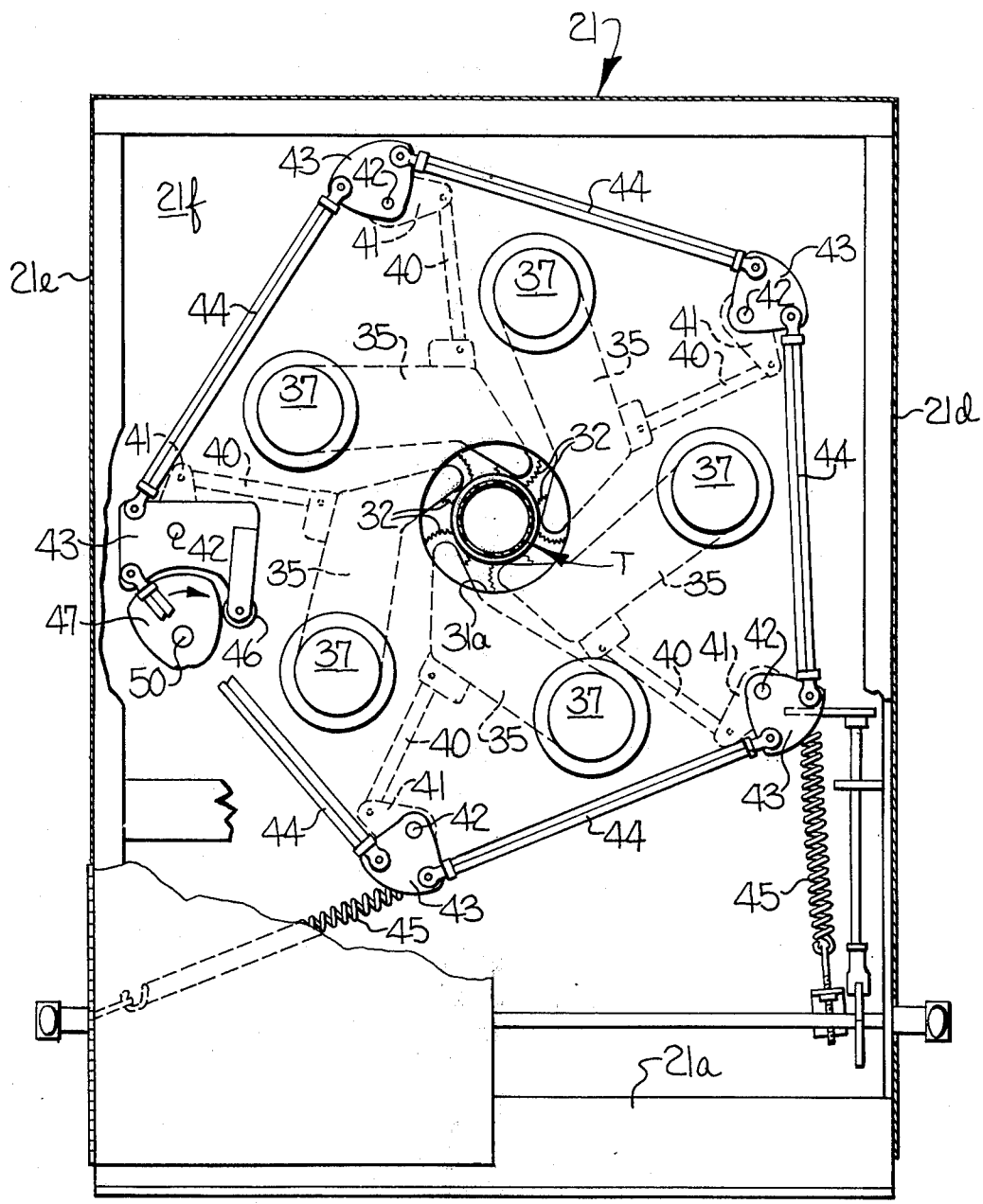
FIG. 12 is an elevation, partially in section, taken substantially along line 12—12 in FIG. 11.

As shown in the lower portion of FIG. 12, two of the cranks 43 have corresponding ends of tension springs 45 connected thereto and whose other ends are connected to any suitable fixed parts of casing 21. Springs 45 serve normally to urge a follower 46 carried by another of the cranks 43 (see FIG. 5 and the left-hand portion of FIG. 12) against the periphery of a rotary cutter operating cam 47. Cam 47 is shaped so that, when its lower surface is in registration with follower 46, springs 45 cause all the rotary cutting blades 31, 32 to move yieldably into cutting engagement with the portion of tube T surrounded thereby and to the extent permitted by cam 47. Conversely, when the high surface of cam 47 moves into engagement with follower 46, cutting blades 31, 32 are withdrawn from tube T and moved out of the path of forward movement of tube T.

Cam 47 is fixed on a cutter operating cam shaft 50 suitably journaled in a horizontal position within casing 21 of the slitting station and extending forwardly through partition 21f in substantially parallel relation to the path of travel of tube T. Cam shaft 50 extends into a gear box 51 (FIGS. 3, 4, 10 and 11) containing suitable gearing, such as beveled gears, for connecting shaft 50 to a driven main cam shaft 52. Shaft 52 is a part of feeding means 23 and extends in substantially right-angular relation to cutter operating cam shaft 50. Main cam shaft 52 also is suitably journaled in casing 21 of the slitting station and extends laterally beneath the path of travel of tube T through the slitting station and is suitably connected to a drive means broadly designated at 54.

Figure 11:
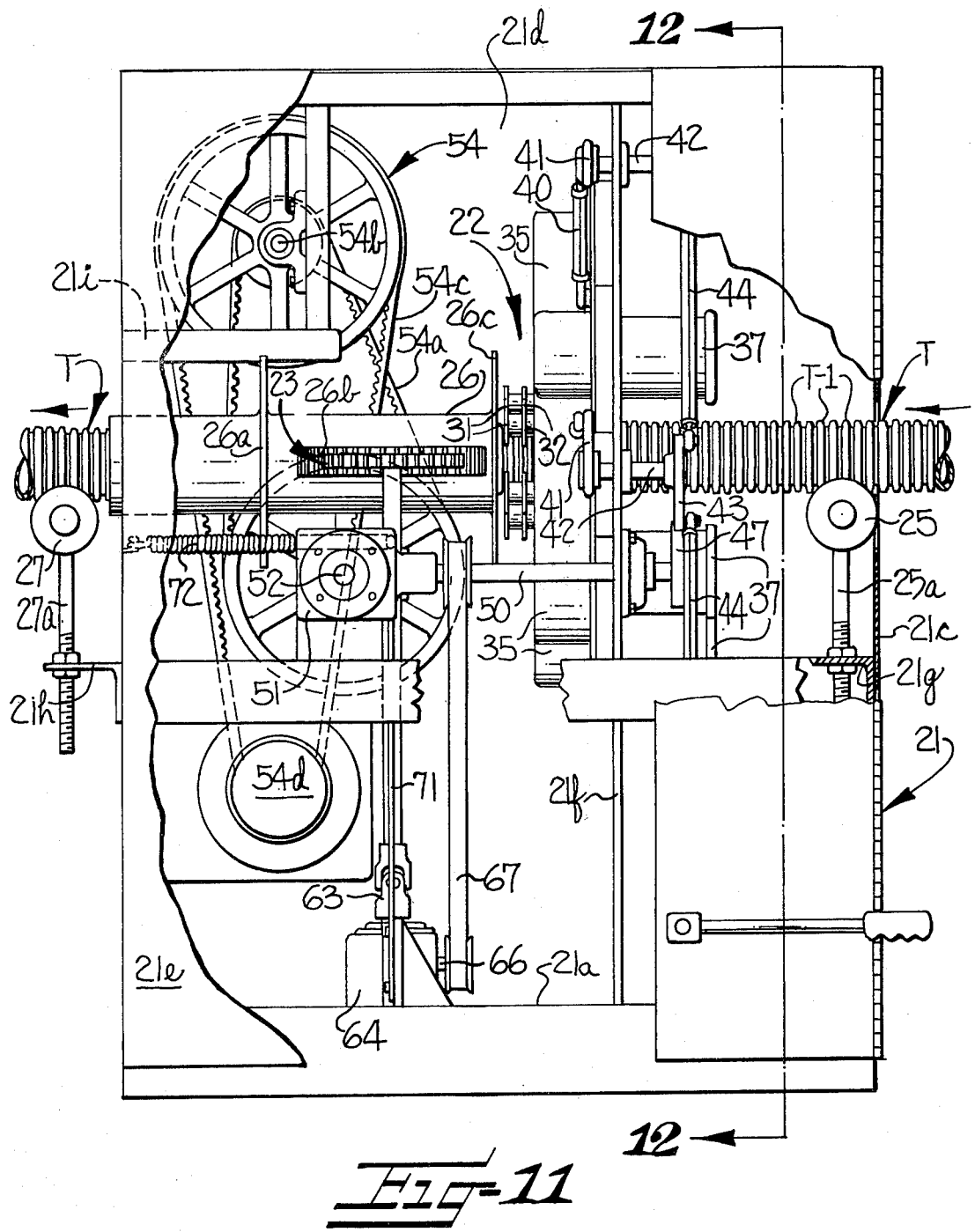
FIG. 11 is a side elevation of the slitting station, with parts broken away and partially in section, and being taken substantially along 11—11 in FIG. 10.

Drive means 54 is shown only schematically in FIG. 4, but is shown more in detail in FIGS. 3, 10 and 11 wherein it will be observed that drive means 54 comprises pulley and belt connections 54a which connect main cam shaft 52 to a jack shaft 54b thereabove. As shown in FIG. 10, jack shaft 54b is suitably journaled in casing 21 of the slitting machine and also has suitable pulley and belt connections 54c extending downwardly therefrom to the output shaft of a main drive electric motor 54d which may be connected to a suitable source of electrical energy by any suitable means, not shown.

The positive tube feeding means 23, while being shown in other views, is best shown in FIGS. 4 and 6–9 in the form of a pair of laterally spaced rotary feed members embodied in feed gears 61, each of which serves as a back-up means for the other, and which are preferably diametrically opposed relative to tube T and meshingly engage the corrugations along opposite sides of the tube T. The shape and spacing of the peripheral teeth of each feed gear 61 are such that, during forward rotation of each feed gear 61, corrugated tube T is fed through the slitting station by virtue of the teeth of the gears 61 meshingly engaging the corrugations of the tube with successive teeth entering successive valleys T-2 and pushing forwardly against the respective ribs T-1 of the corrugated tube.

Feed gears 61 are fixed on the upper portions of respective substantially upright shafts 62 which are perpendicular to a plane which includes the path of travel of tube T. Universal joints 63 connect shafts 62 to corresponding output portions of a suitable gear box 64. The input shaft 66 (FIGS. 4 and 11) of gear box 64 is driven by suitable belt and pulley connections 67 between input shaft 66 and cutter operating cam shaft 50. In order to impart intermittent or stepwise movement to tube T adjacent the cutting blades 31, 32 of slitting means 22 and so that the tube is at a standstill whenever the pairs of cutting blades 31, 32 are in cutting engagement with respective valleys T-2 of tube T, means are provided for imparting a reciprocatory translational movement to each feed gear 61 in a direction parallel to the axis of tube T, as indicated by the associated dash-dot lines and arrows in FIGS. 4 and 6–9, so as to stop forward movement of the corresponding portion of tube T at predetermined intervals of predetermined duration without interrupting rotation of feed gears 61 or moving the same out of engagement with tube T. The rate and extent of rearward translational movement of each feed gear 61 are correlated to the rate of forward rotation of feed gears 61 so that tube T dwells or remains at a standstill throughout the rearward translational movement of feed gears 61.

On the other hand, when forward translational movement is imparted to feed gears 61, tube T is moved forwardly at a rate equal to the rate of rotation of feed gears 61 combined with the rate of forward translational movement of feed gears 61, so that the rate of each forward stepwise movement imparted to tube T may compensate for the lost motion of the tube T required in order that it may dwell for a sufficient time to accommodate the inward and outward movements of cutting blades 31, 32. Accordingly, the medial upper portions of shafts 62 are journaled in a common transverse follower bar 70 fixed on the upper end of a pair of yieldable or spring steel bars 71 whose lower portions are suitably secured on base 21a (FIG. 10). A plurality of springs 72 (FIGS. 3 and 11) normally urge a pair of followers 73 on bar 70 into engagement with the peripheral surfaces of respective rotary cams 74 fixed on main cam shaft 52.

Thus, each time the high surface portions of cams 74 move into engagement with the respective followers 73, the upper portions of upright shafts 62 are moved rearwardly as the proximal portions of feed gears 61 continue to rotate forwardly. It is apparent that this imparts rearward translational movement to feed gears 61 relative to tube T without interrupting rotation of gears 61 so that, for example, a point A on each feed gear 61 (FIG. 6) remains substantially stationary as the respective shafts 62, and the axes of the feed gears 61, move rearwardly into the lateral plane of the point A as shown in FIG. 7.

During the time that the axes of shafts 62 and feed gears 61 are being moved rearwardly, with the point A on feed gears 61 being maintained in a substantially stationary position as in FIGS. 6 and 7, it is apparent that tube T then dwells or is at a standstill. During such dwell of tube T, the low surface of cam 47 (FIGS. 5 and 12) moves into registration with follower 46, thus permitting springs 45 to move all five pairs of slitting saws or cutting blades 31, 32 yieldably into cutting engagement with tube T to effect the slitting of the same in the manner heretofore described.

The succeeding high surface of cam 47 then moves into registration with follower 46 to return the pairs of cutting blades 31, 32 to the inactive position shown in FIGS. 4 and 6–9 so that, as forward translational movement is imparted to gears 61 and tube T from the position of FIG. 7 successively to that of FIGS. 8 and 9, cutting blades 31, 32 are disposed outwardly of the path of travel of tube T. By comparing the solid-line and broken-line portions of tube T in FIGS. 6–9, it will be noted that tube T is rapidly advanced from the position of FIG. 7 through the position of FIG. 8 and to the position of FIG. 9; i.e., a distance equivalent to the center-to-center distance between four valleys T-2, as the lower surfaces of cams 74 (FIG. 4) move into registration with the respective followers 63 and the springs 72 move the transverse bar 70 rearwardly to its original position. Thus, although the two sets of rotary cutting blades 31, 32 form two circular series of slits S in two alternately spaced valleys T-2 (FIG. 1) simultaneously during each active stroke of cutting blades 31, 32, it is apparent that the succeeding stepwise movements of tube T are such that slits still will be formed only in the alternate valleys T-2 of tube T.

Of course, since feed gears 61 rotate continuously in a forward direction, it is apparent that the rate of forward translational movement imparted to feed gears 61 as the low surfaces of cams 74 move into registration with followers 73 is combined with the rate of rotation of feed gears 61 so as to impart an accelerated forward rate of movement to the tube T as compared to the forward peripheral speed of the feed gears 61 as effected by rotation thereof.

It will be observed in FIGS. 3 and 11 that opposite sides of tubular guide 26 are provided with slots 26b therethrough through which the proximal portions of feed gears 61 extend so as to properly engage the corrugations on opposite sides of tube T as the tube is being supported by guide 26. Also, for most efficient operation, it is preferred that feed gears 61 are disposed as close as is practicable to cutting blades 31, 32. However, to insure that accumulations of residual shavings of dust from the cutting operations effected by the cutting blades 31, 32 do not interfere with the operation of feed gears 61, the rear end of tubular guide 26 is provided with an enlarged annular shield or ring 26c thereon (FIGS. 3 and 11) which is disposed in close proximity to the cutting blades 31, 32 to minimize accumulation of shavings and dust, produced by the operation of the cutting blades, on feed gears 61.

From the foregoing description, it can be appreciated that the pairs of cutting blades 31, 32 are rotated continuously by their respective electric motors 37 during operation of the slitting station. Also, since motor 54d drives both cam shafts 50, 52 as well as the feed gears 61, it follows that the movements of cutting blades 31, 32 into and out of cutting engagement with tube T always occur between successive stepwise movements of tube T.

As heretofore described, as the corrugated tube T passes through the slitting station, it is fed in a predetermined stepwise manner by feed gears 61 and, between successive stepwise movements of the corrugated tube T, the circular series of five pairs of rotary cutting blades 31, 32 simultaneously cut two circular series of slits in two corresponding valleys T-2 of tube T, in the course of which cutting blades 31, 32 form five elongate substantially uniformly spaced and arcuately extending or transverse slits through each of the corresponding valleys of the tube T. It is also seen that the stepwise movements imparted to the tube by the feeding means 23 move the tube forwardly at a rate compensatingly greater than the rate of rotation of each feed gear 61 and so that the overall rate of movement of the tube through the slitting station may be substantially in accord with the mean rate of rotation of the feed gears 61.

Although the forwardly moving teeth which engage and feed the tube T are shown as gear teeth, it is apparent that the teeth may be carried by endless belts, sprocket chains, or the like without departing from the invention. While the forwardly moving teeth of gears 61 represent the preferred embodiment of the invention, especially for feeding a corrugated tube, it is to be understood that where the elongate member to be slit has a non-corrugated or relatively smooth peripheral surface, endless friction surfaces, such as friction belts or pulleys, may be substituted for the teeth of feed gears 61 so as to engage and apply the desired stepwise pushing force to the peripheral surface of the tube for feeding the same through the slitting station.

In the drawings and specification there has been set forth a preferred embodiment of the invention and, although specific terms are employed, they are used in a generic and descriptive sense only and not for purposes of limitation.

That which is claimed is:

1. Apparatus for forming slits in a corrugated tube having annular corrugations of alternating ribs and valleys thereon, said apparatus comprising a slitting station having a plurality of normally inactive cutting blades, said slitting station also having means for feeding the corrugated tube therethrough comprising a rotary feed gear having peripheral teeth thereon adapted to successively enter successive valleys of the tube and to push forwardly against respective ribs of the tube during forward rotation of said feed gear, drive means for continuously rotating said feed gear forwardly at a predetermined peripheral speed, means operatively associated with said feed gear for stopping the tube at predetermined intervals of predetermined duration and comprising means operatively associated with said drive means for repeatedly imparting rearward translational movement and then forward translational movement to the feed gear with the rate of rearward translational movement of the feed gear being correlated to the rate of forward rotation thereof so that the tube dwells throughout the rearward translational movement thereof and so that the feed gear moves the tube forwardly at a rate equal to the rate of rotation of the feed gear combined with the rate of forward translational movement of the feed gear during each successive forward translational movement of the feed gear, means automatically operable during the course of each successive rearward translational movement of said feed gear for activating said cutting blades and moving the same into cutting engagement with the tube each time the tube dwells in its course through the slitting station, and an elongate tubular guide member extending through said slitting station and defining an encircling restricting passageway for directing the corrugated tube past said cutting blades and into meshing engagement with said feed gear, said tubular guide member having one end thereof positioned immediately adjacent to said cutting blades but out of cutting engagement therewith and serving for preventing any substantial displacement of the tube by said cutting blades during their movement into cutting engagement with the tube, and said tubular guide member having an elongate opening in the wall thereof adjacent to said feed gear through which the peripheral teeth of the feed gear extend for meshingly engaging with the corrugated tube and feeding the same through the slitting station while the tubular guide member prevents any substantial displacement of the tube by the feed gear during said forward and rearward translational movement of the feed gear during feeding of the tube through the slitting station.

* * * * *